US012502686B1

(12) United States Patent
Causey et al.

(10) Patent No.: US 12,502,686 B1
(45) Date of Patent: Dec. 23, 2025

(54) AUTOMATED PAINTING MACHINE

(71) Applicants: Sharmon Causey, Stockbridge, GA (US); James Causey, Stockbridge, GA (US)

(72) Inventors: Sharmon Causey, Stockbridge, GA (US); James Causey, Stockbridge, GA (US)

( * ) Notice: Subject to any disclaimer, the term of this patent is extended or adjusted under 35 U.S.C. 154(b) by 508 days.

(21) Appl. No.: 18/100,643

(22) Filed: Jan. 24, 2023

(51) Int. Cl.
*B05C 1/08* (2006.01)
*B05B 13/00* (2006.01)
*B05C 1/06* (2006.01)
*B25J 5/00* (2006.01)

(52) U.S. Cl.
CPC .............. *B05C 1/06* (2013.01); *B05B 13/005* (2013.01); *B05C 1/0813* (2013.01); *B25J 5/00* (2013.01); *B25J 5/007* (2013.01)

(58) Field of Classification Search
CPC .... B05C 1/0813; B05C 11/023; B05C 11/025
See application file for complete search history.

(56) References Cited

U.S. PATENT DOCUMENTS

| | | | |
|---|---|---|---|
| 2,892,439 A * | 6/1959 | Dynia | B05C 17/0205 15/103.5 |
| 3,847,112 A | 11/1974 | Wise | |
| 5,358,568 A * | 10/1994 | Okano | B05B 15/68 118/712 |
| 6,245,392 B1 * | 6/2001 | Hillenbrand | B05C 9/14 427/500 |
| 8,029,739 B2 * | 10/2011 | Field | A47L 11/305 422/243 |
| 10,357,793 B2 * | 7/2019 | Harvison | B05B 12/122 |
| 10,751,742 B2 | 8/2020 | Mettu | |
| 11,090,674 B2 | 8/2021 | Raman | |
| 11,260,411 B2 | 3/2022 | Gonzalez | |
| 12,383,920 B2 * | 8/2025 | Tobkin | B05B 15/50 |
| 2006/0275552 A1 | 12/2006 | Vendlinski | |
| 2010/0143089 A1 * | 6/2010 | Hvass | G05D 1/027 414/754 |
| 2013/0122186 A1 * | 5/2013 | Hoppel | B05D 1/00 118/712 |
| 2016/0332186 A1 * | 11/2016 | Richards | E01C 11/005 |
| 2018/0281012 A1 | 10/2018 | Telleria | |
| 2019/0255551 A1 * | 8/2019 | Hargadon | B25J 9/1664 |
| 2024/0254702 A1 * | 8/2024 | Morrison | B05B 13/005 |

* cited by examiner

Primary Examiner — Karl Kurple

(57) ABSTRACT

The automated painting machine is a robot. The automated painting machine is configured for use with paint. The automated painting machine automatically applies the paint to a surface. The automated painting machine includes a housing structure, a fluid management structure, a plurality of actuator structures, and a control circuit. The fluid management structure, the plurality of actuator structures, and the control circuit are contained in the housing structure. The fluid management structure stores and transports the paint through the housing to the surface. The plurality of actuator structures provide the motive forces required to apply the paint to the desired locations on the surface. The control circuit controls the operation of the fluid management structure and the plurality of actuator structures.

15 Claims, 6 Drawing Sheets

AUTOMATED PAINTING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of machines for applying fluent materials to a surface. (B05B13/00)

Summary of Invention

The automated painting machine is a robot. The automated painting machine is configured for use with paint. The automated painting machine automatically applies the paint to a surface. The automated painting machine comprises a housing structure, a fluid management structure, a plurality of actuator structures, and a control circuit. The fluid management structure, the plurality of actuator structures, and the control circuit are contained in the housing structure. The fluid management structure stores and transports the paint through the housing to the surface. The plurality of actuator structures provide the motive forces required to apply the paint to the desired locations on the surface. The control circuit controls the operation of the fluid management structure and the plurality of actuator structures.

These together with additional objects, features and advantages of the automated painting machine will be readily apparent to those of ordinary skill in the art upon reading the following detailed description of the presently preferred, but nonetheless illustrative, embodiments when taken in conjunction 8 with the accompanying drawings.

In this respect, before explaining the current embodiments of the automated painting machine in detail, it is to be understood that the automated painting machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated painting machine.

It is therefore important that the claims be regarded as including such equivalent construction insofar as they do not depart from the spirit and scope of the automated painting machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
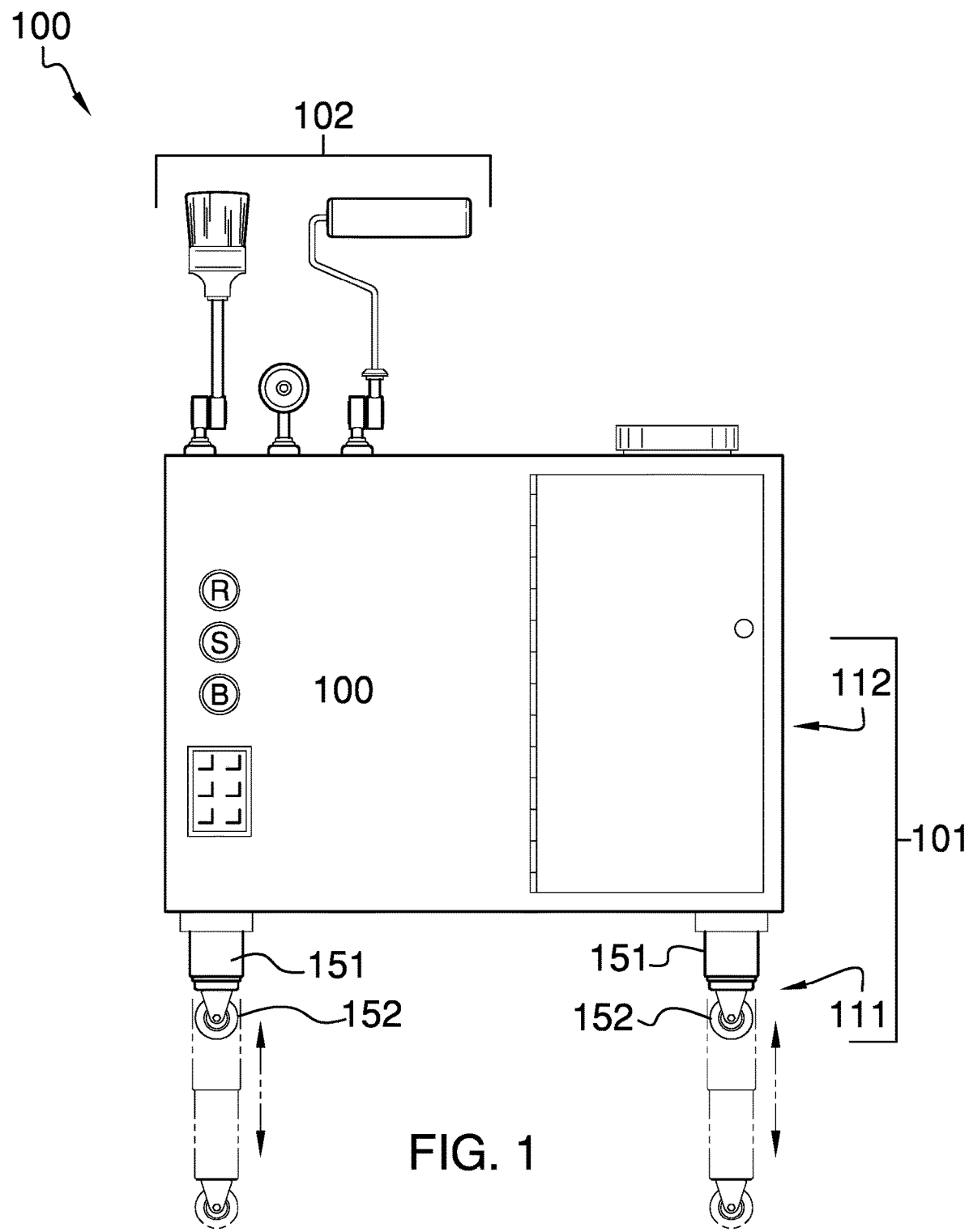
FIG. 1 is a front view of an embodiment of the disclosure.
Figure 2:
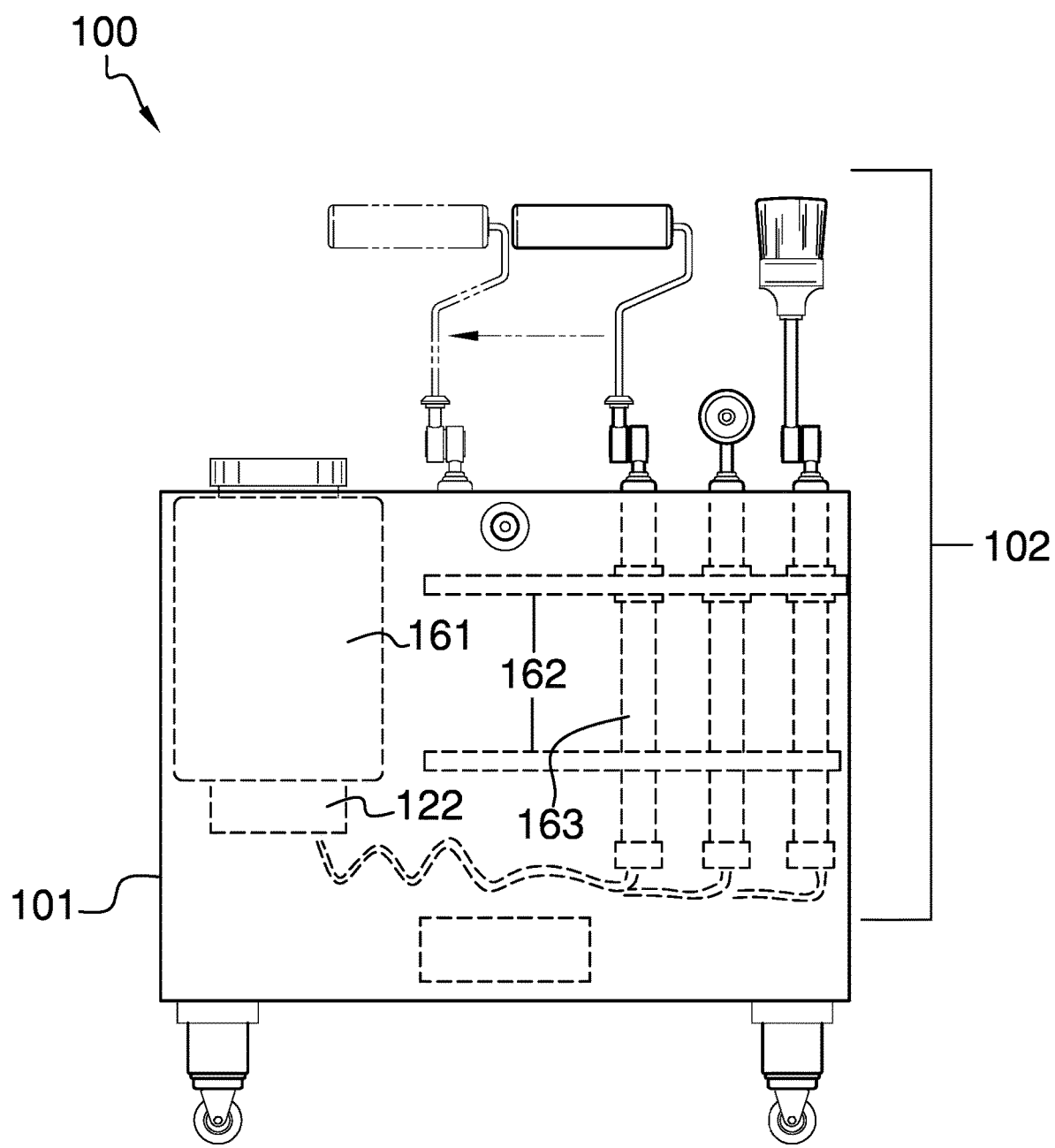
FIG. 2 is a rear view of an embodiment of the disclosure.
Figure 3:
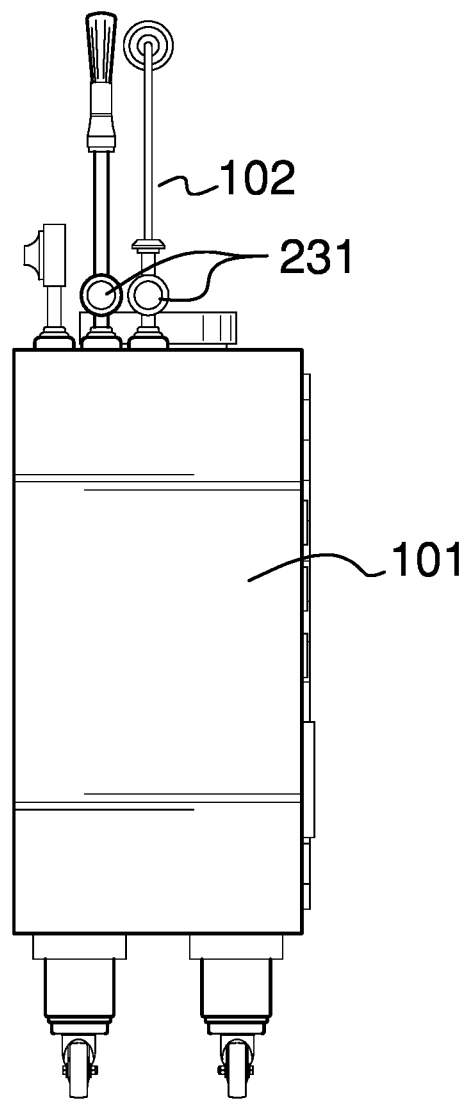
FIG. 3 is a side view of an embodiment of the disclosure.
Figure 4:
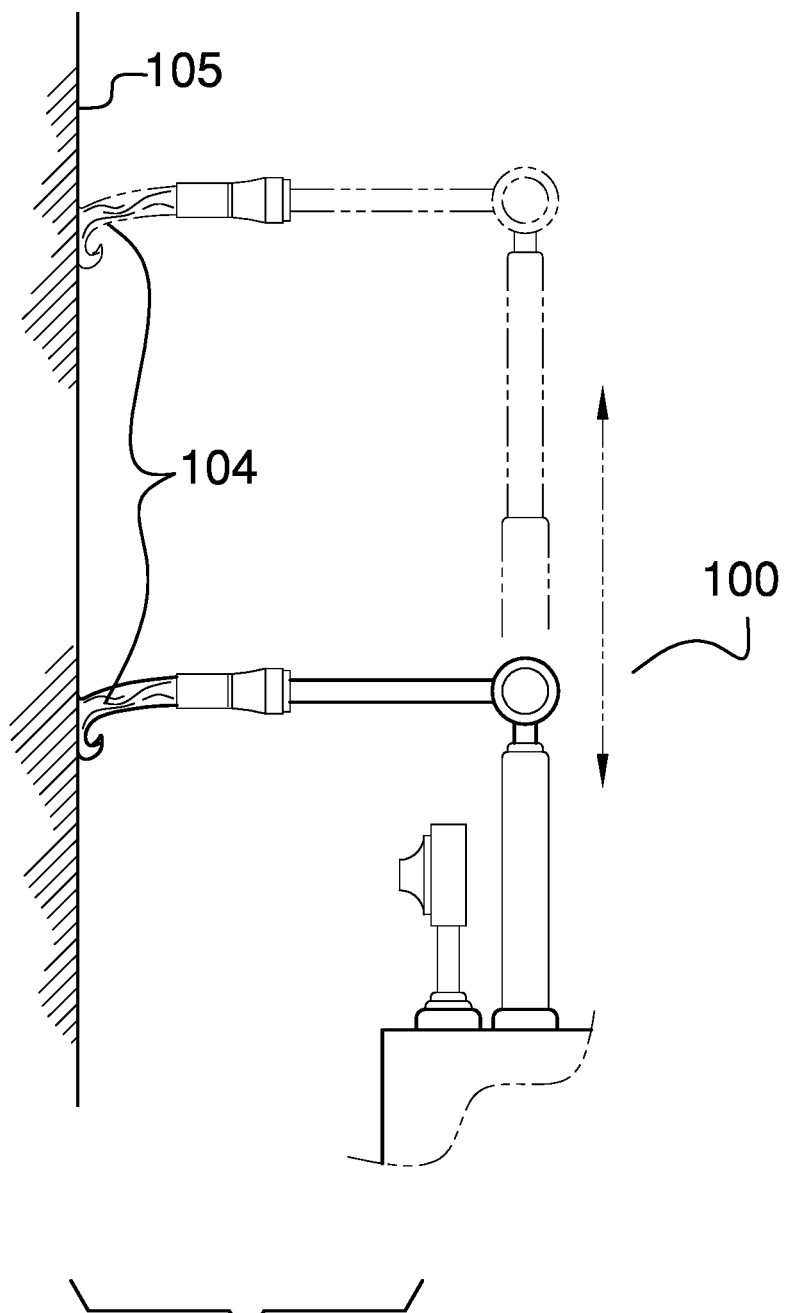
FIG. 4 is a detail view of an embodiment of the disclosure.
Figure 5:
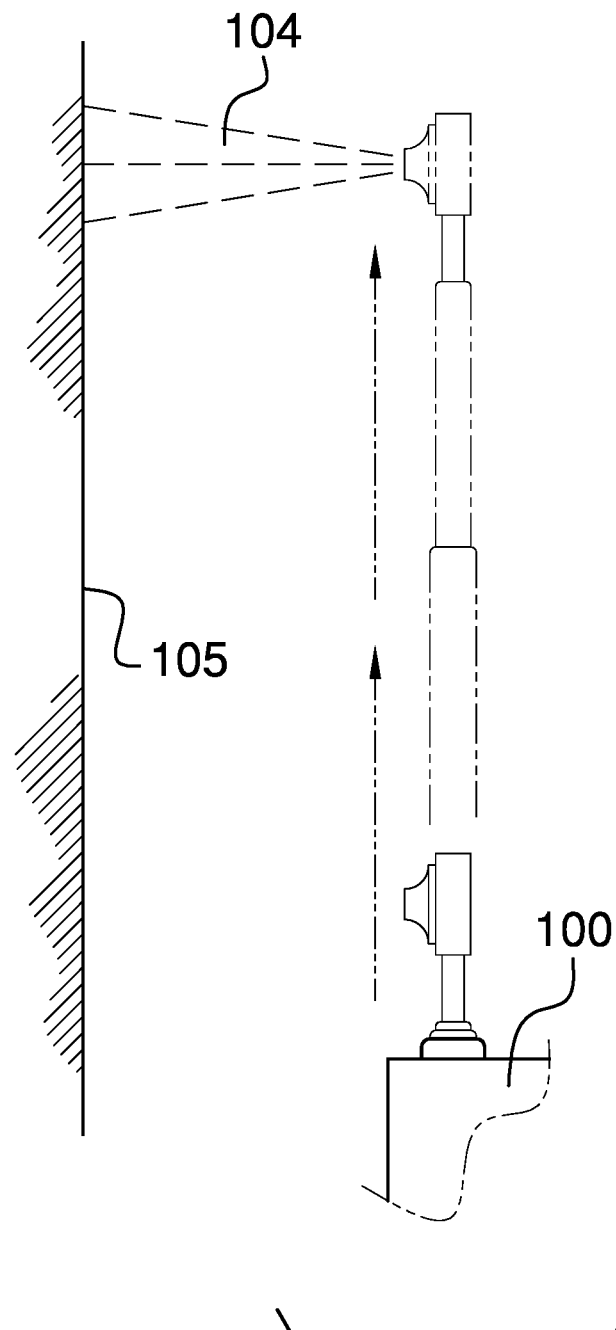
FIG. 5 is a detail view of an embodiment of the disclosure.
Figure 6:
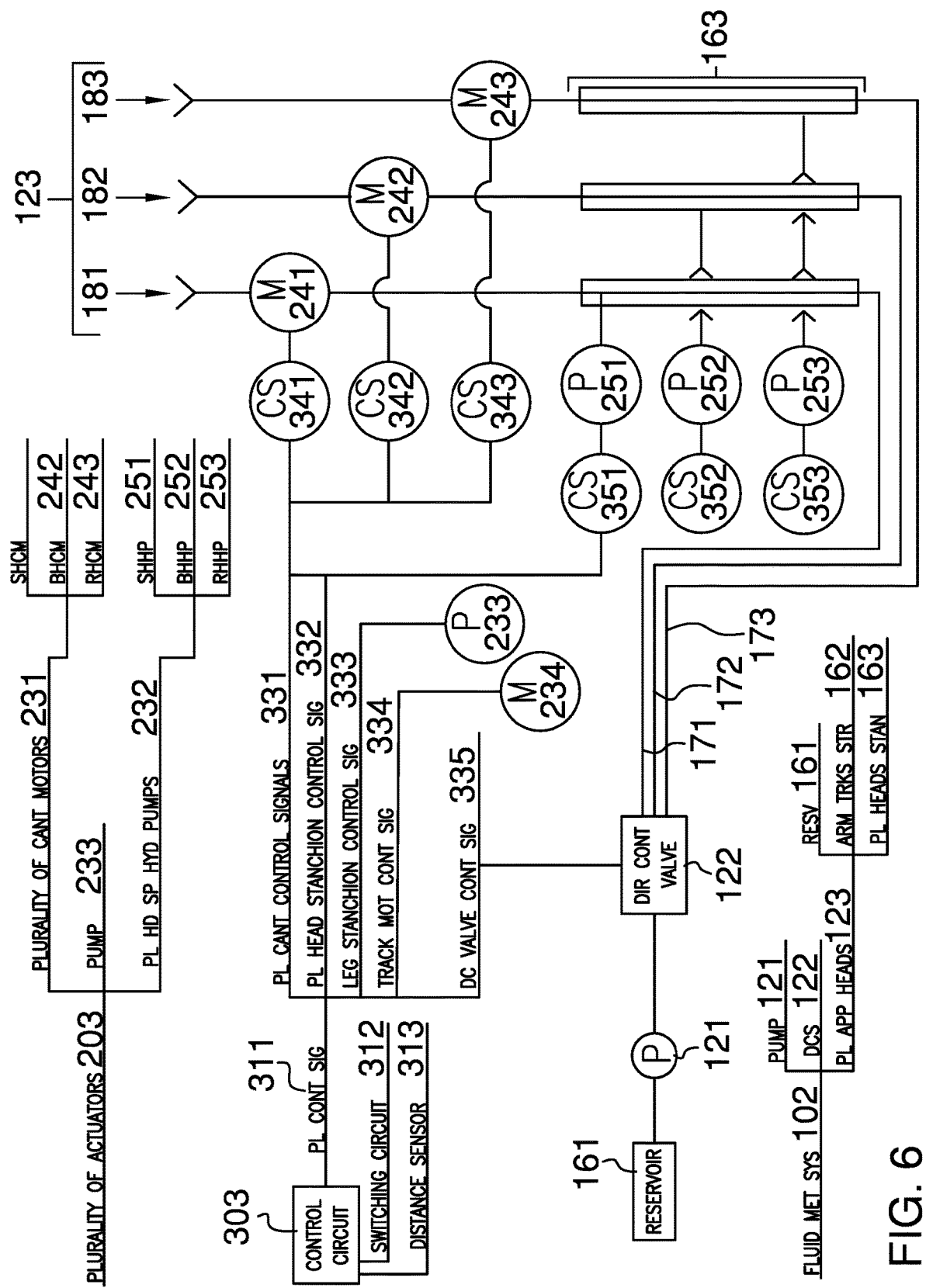
FIG. 6 is a schematic view of an embodiment of the disclosure.

Detailed reference will now be made to one or more potential embodiments of the disclosure, which are illustrated in FIGS. 1 through 6.

The automated painting machine 100 (hereinafter invention) is a robot. The invention 100 is configured for use with paint 104. The invention 100 automatically applies the paint 104 to a surface 105. The invention 100 comprises a housing structure 101, a fluid management structure 102, a plurality of actuator structures 203, and a control circuit 303. The fluid management structure 102, the plurality of actuator structures 203, and the control circuit 303 are contained in the housing structure 101. The fluid management structure 102 stores and transports the paint 104 through the housing to the surface 105. The plurality of actuator structures 203 provide the motive forces required to apply the paint 104 to the desired locations on the surface 105. The control circuit 303 controls the operation of the fluid management structure 102 and the plurality of actuator structures 203.

The housing structure 101 is a rigid structure. The housing structure 101 is a roughly prism shaped structure. The housing structure 101 has the primary shape of a prism. The housing structure 101 is a hollow structure. The housing structure 101 is a rolling structure. The housing structure 101 forms a protected space that contains the fluid management structure 102, the plurality of actuator structures 203, and the control circuit 303. The housing structure 101 is formed with all the form factors and apertures required to support the operations of the fluid management structure 102, the plurality of actuator structures 203, and the control circuit 303. The housing structure 101 comprises a pedestal structure 111 and a shell structure 112.

The pedestal structure 111 is a mechanical structure. The pedestal structure 111 is a load bearing structure. The pedestal structure 111 attaches to the inferior surface of the shell structure 112. The pedestal structure 111 rest on the supporting surface. The pedestal structure 111 transfers the load of the invention 100 to the supporting surface. The pedestal structure 111 elevates the shell structure 112 above the supporting surface. The pedestal structure 111 is an adjustable structure. By adjustable is meant that the elevation of the shell structure 112 adjusts by adjusting the pedestal structure 111. The pedestal structure 111 is a rolling structure. The pedestal structure 111 comprises a plurality of hydraulic leg stanchions 151 and a plurality of casters 152. The plurality of hydraulic leg stanchions 151 forms a load bearing structure. The plurality of hydraulic leg stanchions 151 forms the structure that elevates the shell structure 112 above the supporting surface. The plurality of hydraulic leg stanchions 151 is an adjustable structure. By adjustable is meant that the span of the length of each hydraulic leg stanchion selected from the plurality of hydraulic leg stanchions 151 is adjustable. The elevation of the shell structure 112 adjusts by adjusting the span of the length of each hydraulic leg stanchion selected from the plurality of hydraulic leg stanchions 151. The control circuit 303 controls the span of the length of the plurality of hydraulic leg stanchions 151.

Each caster selected from the plurality of casters 152 is a rolling structure. Each caster selected from the plurality of casters 152 attaches to the inferior end of a hydraulic leg stanchion selected from the plurality of hydraulic leg stanchions 151. Each caster selected from the plurality of casters 152 transfers the load its associated hydraulic leg stanchion to the supporting surface. The plurality of casters allow the housing structure 101 to roll over the supporting surface.

The shell structure 112 is a rigid structure. The shell structure 112 is a prism shaped structure. The shell structure 112 is a hollow structure. The shell structure 112 forms the protected space that contains the fluid management structure 102, the plurality of actuator structures 203, and the control circuit 303. The shell structure 112 is formed with all the form factors and apertures required to support the operations of the fluid management structure 102, the plurality of actuator structures 203, and the control circuit 303. The shell structure 112 comprises a paint 104 reservoir 161, an arm track structure 162, and a plurality of hydraulic head stanchions 163.

The paint reservoir 161 is a fluid impermeable container. The paint reservoir 161 contains the paint 104. The paint reservoir 161 forms a fluidic connection with the paint pump 121. The paint pump 121 draws the paint 104 directly out of the paint reservoir 161.

The arm track structure 162 is a mechanical structure. The plurality of hydraulic head stanchions 163 attach to the arm track structure 162. The arm track structure 162 forms a track that guides the movement of the plurality of hydraulic head stanchions 163 in the horizontal direction.

Each hydraulic head stanchion selected from the plurality of hydraulic head stanchions 163 is a hydraulic structure. An applicator head selected from the plurality of applicator heads 123 attaches to a hydraulic head stanchion selected from the plurality of hydraulic head stanchions 163. Each selected hydraulic head stanchion is an adjustable structure such that elevation of the applicator head associated with the selected hydraulic head stanchion is adjustable. The applicator head associated with the selected hydraulic head stanchion mounts on the superior end of the selected hydraulic head stanchion.

The fluid management structure 102 is the structure that manages the paint 104 within the invention 100. The fluid management structure 102 stores the paint 104. The fluid management structure 102 generates the physical motive forces necessary to transport the paint 104. The fluid management structure 102 routes the transported paint 104 to an applicator head selected from a plurality of applicator heads 123. The fluid management structure 102 discharges the paint 104 from the selected applicator head to the surface 105 that is targeted to receive the paint 104. The fluid management structure 102 comprises a paint 104 pump 121, a directional control valve 122, and a plurality of applicator heads 123. The paint 104 pump 121, the directional control valve 122, and the plurality of applicator heads 123 are fluidically interconnected.

The paint 104 pump 121 is a pump. The paint 104 pump 121 generates a pressure differential that transports the paint 104 through the directional control valve 122 and the plurality of applicator heads 123 for discharge onto the target surface 105.

The directional control valve 122 is a valve structure. The directional control valve 122 is a three way four position directional control valve 122. The directional control valve 122 is controlled by the paint 104. The directional control valve 122 forms a fluidic connection with the paint 104 pump 121. The directional control valve 122 receives paint 104 under pressure from the paint 104 pump 121. The directional control valve 122 forms a fluidic connection between the received paint 104 and each applicator head selected from the plurality of applicator heads 123. The directional control valve 122 routes the received paint 104 to an applicator head selected from the plurality of applicator heads 123. The selected applicator head is provided to the directional control valve 122 through the control circuit 303. The directional control valve 122 comprises a spray head 181 port 171, a brush head 182 port 172, a roller head 183 port 173, and an input port 174.

The spray head 181 port 171 is a discharge port of the directional control valve 122. The spray head 181 port 171 forms a fluidic connection with the spray head 181. The control circuit 303 opens the fluidic connection such that paint 104 flows through the input port 174 and the spray head 181 port 171 to the spray head 181 when the spray head 181 port 171 is in the first position. The spray head 181 port 171 is in the closed position when the control circuit 303 places the directional control valve 122 in a position selected from the group consisting of the second position, the third position, and the fourth position.

The brush head 182 port 172 is a discharge port of the directional control valve 122. The brush head 182 port 172 forms a fluidic connection with the brush head 182. The control circuit 303 opens the fluidic connection such that paint 104 flows through the input port 174 and the brush head 182 port 172 to the brush head 182 when the brush head 182 port 172 is in the second position. The brush head 182 port 172 is in the closed position when the control circuit 303 places the directional control valve 122 in a position selected from the group consisting of the first position, the third position, and the fourth position.

The roller head 183 port 173 is a discharge port of the directional control valve 122. The roller head 183 port 173 forms a fluidic connection with the roller head 183. The control circuit 303 opens the fluidic connection such that paint 104 flows through the input port 174 and the roller head 183 port 173 to the roller head 183 when the roller head 183 port is in the third position. The roller head 183 port 173 is in the closed position when the control circuit 303 places the directional control valve 122 in a position selected from the group consisting of the first position, the second position, and the fourth position.

The input port 174 forms a fluidic connection with the paint 104 pump 121. The input port 174 receives the paint 104 from the paint 104 pump 121 into the directional control valve 122.

Each applicator head selected from the plurality of applicator heads 123 is a nozzle structure. Each selected applicator head receives paint 104 under pressure from the directional control valve 122. Each selected applicator head discharges the received paint 104 directly onto the targeted surface. The elevation of each selected applicator head above the pedestal structure 111 is adjustable. The plurality of applicator heads 123 comprises a spray head 181, a brush head 182, and a roller head 183. The spray head 181 is a paint 104 sprayer. The spray head 181 discharges the paint 104 received from the directional control valve 122 as a spray onto the targeted surface. The brush head 182 is a paint 104 brush. The brush head 182 applies the paint 104 received from the directional control valve 122 as a coating. The roller head 183 is a paint 104 brush. The roller head 183 applies the paint 104 received from the directional control valve 122 as a coating.

Each actuator structure selected from the plurality of actuator structures 203 is a mechanical device. The plurality of actuator structures 203 provides the motive forces necessary to target the paint 104 that is discharged from the fluid management structure to a specific location on the targeted surface 105. The plurality of actuator structures adjust the elevation of the housing structure 101 relative to the supporting surface. The plurality of actuator structures 203 adjust the elevations of the plurality of applicator heads relative to the supporting surface. The plurality of actuator structures 203 adjust the horizontal positions of the plurality of applicator heads 123 relative to the supporting surface. The plurality of actuator structures 203 adjust the discharge cants of the paint 104 that is discharged from the plurality of applicator heads 123 relative to the force of gravity. The plurality of actuator structures 203 comprises a plurality of cant motors 231, a plurality of head stanchion hydraulic pumps 232, a leg stanchion hydraulic pump 233, and an arm track motor 234.

Each cant motor selected from the plurality of cant motors 231 is an electric motor. Each selected cant motor secures an applicator head selected from the plurality of applicator heads 123 to the hydraulic head stanchion associated with the selected applicator head. Each selected cant motor adjusts the cant of the discharge of the paint 104 relative to the force of gravity. The control circuit 303 controls the operation of each selected cant motor. The plurality of cant motors 231 comprises a spray head 181 cant motor 241, a brush head 182 cant motor 242, and a roller head 183 cant motor 243.

The spray head 181 cant motor 241 attaches the spray head 181 to the hydraulic head stanchion selected from the plurality of hydraulic head stanchions 163 that is associated with the spray head 181. The spray head 181 cant motor 241 provides the motive forces that rotate the spray head 181 relative to the associated hydraulic head structure.

The brush head 182 cant motor 242 attaches the brush head 182 to the hydraulic head stanchion selected from the plurality of hydraulic head stanchions 163 that is associated with the brush head 182. The brush head 182 cant motor 242 provides the motive forces that rotate the brush head 182 relative to the associated hydraulic head structure.

The roller head 183 cant motor 243 attaches the roller head to the hydraulic head stanchion selected from the plurality of hydraulic head stanchions 163 that is associated with the roller head 183. The roller head 183 cant motor 243 provides the motive forces that rotate the roller head 183 relative to the associated hydraulic head structure.

Each hydraulic head stanchion pump selected from the plurality of head stanchion hydraulic pumps 232 is a hydraulic pump. Each selected hydraulic head stanchion pump controls the span of the length hydraulic head stanchion. The elevation of the applicator head associated with any selected hydraulic head stanchion is adjusted by the hydraulic head stanchion pump. The control circuit 303 controls the operation of each selected hydraulic head stanchion pump. The plurality of head stanchion hydraulic pumps 232 comprises a spray head 181 hydraulic pump 251, a brush head 182 hydraulic pump 252, and a roller head 183 hydraulic pump 253.

The spray head 181 hydraulic pump 251 is a hydraulic pump that controls the hydraulic pressure of a fluid contained in the hydraulic head stanchion selected from the plurality of hydraulic head stanchions 163 that is associated with the spray head 181. The spray head 181 hydraulic pump 251 provides the motive forces that are necessary to change the elevation of the spray head 181 relative to the supporting surface.

The brush head 182 hydraulic pump 252 is a hydraulic pump that controls the hydraulic pressure of a fluid contained in the hydraulic head stanchion selected from the plurality of hydraulic head stanchions 163 that is associated with the brush head 182. The brush head 182 hydraulic pump 252 provides the motive forces that are necessary to change the elevation of the brush head 182 relative to the supporting surface.

The roller head 183 hydraulic pump 253 is a hydraulic pump that controls the hydraulic pressure of a fluid contained in the hydraulic head stanchion selected from the plurality of hydraulic head stanchions 163 that is associated with the roller head 183. The roller head 183 hydraulic pump 253 provides the motive forces that are necessary to change the elevation of the roller head 183 relative to the supporting surface.

The leg stanchion hydraulic pump 233 is a hydraulic pump. The leg stanchion hydraulic pump 233 controls the span of the length of each hydraulic leg stanchion selected from the plurality of hydraulic leg stanchions 151. The control circuit 303 controls the operation of the leg stanchion hydraulic pump 233.

The arm track motor 234 is an electric motor. The arm track motor 234 mounts on the arm track motor 234. The arm track motor 234 provides the motive forces necessary to move the plurality of applicator heads 123 in the horizontal direction along the track formed by the arm track structure 162.

The control circuit 303 is an electric circuit. The control circuit 303 controls the operation of the fluid management structure 102. The control circuit 303 controls the operation of each actuator structure selected from the plurality of actuator structures 203. The control circuit 303 comprises a plurality of control signals 311, a switching circuit 312, and a distance sensor 313.

The switching circuit 312 is an electric circuit. The switching circuit 312 electrically connects to the control circuit 303. The switching circuit 312 allows a user to select the applicator head from the plurality of applicator heads 123 that is used to apply the paint 104. The distance sensor 313 is a distance sensor 313. The distance sensor 313 provides an indication to the control circuit 303 of the span of the 14 distance between the targeted surface and the control circuit 303.

Each control signal selected from the plurality of control signals 311 is an electric signal generated by the control circuit 303. Each control signal selected from the plurality of control signals 311 controls the operation of an actuator structure selected from the plurality of actuator structures 203. The plurality of control signals 311 comprises a plurality of cant control signals 331, a plurality of head stanchion control signals 332, a leg stanchion hydraulic control signal 333, an arm track motor 234 control signal 334, and a directional control valve 122 control signal 335.

The leg stanchion hydraulic control signal 333 forms the electric control signal that is used by the control circuit 303 to control the operation of the leg stanchion hydraulic pump 233.

The arm track motor 234 control signal 334 forms the electric control signal that is used by the control circuit 303 to control the operation of the arm track motor 234.

The directional control valve 122 control signal 335 forms the electric control signal that is used by the control circuit to control the operation of the directional control valve 122.

The plurality of cant control signals 331 forms the collection of electric control signals that are used by the control circuit 303 to control the operation of the plurality of cant motors 231. The plurality of cant control signals 331 comprises a spray head 181 cant control signal 341, a brush head 182 cant control signal 342, and a roller head 183 cant control signal 343. The spray head 181 cant control signal 341 forms the electric control signal that is used by the control circuit 303 to control the operation of the spray head 181 cant motor 241. The brush head 182 cant control signal 342 forms the electric control signal that is used by the control circuit 303 to control the operation of the brush head 182 cant motor 242. The roller head 183 cant control signal 343 forms the electric control signal that is used by the control circuit 303 to control the operation of the roller head 183 cant motor 243.

The plurality of head stanchion control signals 332 forms the collection of electric control signals that are used by the control circuit 303 to control the operation of the plurality of head stanchion hydraulic pumps 232. The plurality of head stanchion control signals 332 comprises a spray head 181 hydraulic control signal 351, a brush head 182 hydraulic control signal 352, and a roller head 183 hydraulic control signal 353.

The spray head 181 hydraulic control signal 351 forms the electric control signal that is used by the control circuit 303 to control the operation of the spray head 181 hydraulic pump 251. The brush head 182 hydraulic control signal 352 forms the electric control signal that is used by the control circuit 303 to control the operation of the brush head 182 hydraulic pump 252. The roller head 183 hydraulic control signal 353 forms the electric control signal that is used by the control circuit 303 to control the operation of the roller head 183 hydraulic pump 253.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Brush: As used in this disclosure, a brush is a tool comprising a plurality of bristles set into a handle or a base that is used for grooming, sweeping, smoothing, cleaning, scrubbing, or painting.

Cant: As used in this disclosure, a cant is an angular deviation from one or more reference lines (or planes) such as a vertical line (or plane) or a horizontal line (or plane).

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Correspond: As used in this disclosure, the term correspond is used as a comparison between two or more objects wherein one or more properties shared by the two or more objects match, agree, or align within acceptable manufacturing tolerances.

Cutting In: As used in this disclosure, cutting in is a process of painting the corners or edges of a room that are too small or "tight" to be precisely painted with a paint roller or a paint sprayer. Common areas of cutting in include, door and window trims, corners formed by two walls or corners formed by a wall and a ceiling, electrical outlets and moldings such as crown moldings or baseboards.

Directional Control Valve: As used in this disclosure, a directional control valve is a valve that directs the flow of a fluid into a specific flow path within a fluid network. The basic directional control valve has an intake port that receives the incoming fluid and two or more discharge ports that discharge the fluid into the desired flow path. A directional control valve is often identified as an "N-way X-position valve." The N-way refers to the number of flow paths the directional control valve supports (or, equivalently, the number of discharge ports supported by the directional control valve). The X-position refers to the number of flow configurations the directional control valve supports. For example, a 2-way 4-position direction control valve supports the following configurations: a) permitting the flow of a fluid from the intake port through a first discharge port while preventing the flow of the fluid through a second discharge port; b) permitting the flow of the fluid from the intake port through the second discharge port while preventing the flow of the fluid through the first discharge port; c) permitting the flow of the fluid through both the first discharge port and the second discharge port simultaneously; and, d) preventing the flow of fluid through both the first discharge port and the second discharge port. A spool valve is often used as a directional control valve.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distance Sensor: As used in this disclosure, a distance sensor is an electrical sensing device that detects the presence and distance of an object within the field of view of the distance sensor.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Electrically Operated Valve: As used in this disclosure, an electrically operated valve is a valve that: a) uses electrical energy to power the actuation of the electrically operated valve; or b) uses electrically generated signals to control the actuation of the electrically operated valve. A solenoid valve is a type of electrically operated valve.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Hydraulic: As used in this disclosure, hydraulic refers to a device wherein the movement of the device is powered using a fluid under pressure. The terms pneumatic and hydraulic can be used interchangeably. This disclosure assumes that: a) the use of hydraulic implies that the fluid is a liquid; and, b the use of pneumatic implies that the fluid is a gas.

Hydraulic Cylinder: As used in this disclosure, a hydraulic cylinder is a telescopic composite prism structure comprising an outer cylinder (or other tubular prism structure) and a matching piston structure. The piston structure mounts in the outer cylinder such that the position of the piston structure within the outer cylinder structure of the hydraulic cylinder is adjustable. The combination of the outer cylinder and the piston structure forms a reservoir within the hydraulic cylinder that contains a fluid, referred to as a hydraulic fluid. The reservoir forms a variable containment volume structure. The pressure of the hydraulic fluid contained within the reservoir varies as a function of the containment volume of the hydraulic cylinder. This arrangement allows for the adjustment of the piston position by applying an external force to change the pressure of the hydraulic fluid contained in the reservoir. Alternately, the pressure of the hydraulic fluid in the reservoir can be adjusted applying an external force to change the position of the piston structure within the outer cylinder.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Manifold: As used in this disclosure, a manifold is a pipe or chamber having several ports through which one or more fluids are gathered or distributed.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is an electrical device that accepts digital and analog inputs, processes the digital and analog inputs according to previously specified logical processes and provides the results of these previously specified logical processes as digital or analog outputs. The disclosure allows, but does not assume, that the logic module is programmable.

Motor: As used in this disclosure, a motor refers to the method of transferring energy from an external power source into mechanical energy.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Paint: As used in this disclosure, when used as a noun the term paint refers to a pigment based colloid or solution that is applied to a surface as a coating of the surface. When used as a verb, the term paint refers to the application of paint to a surface.

Paint Brush: As used in this disclosure, a paint brush is a brush that is specifically designed to apply paint to a surface.

Painting Pad: As used in this disclosure, a paint pad is a painting tool that comprises a textile that is mounted on a foam backing wherein the foam backing is mounted on a plate. The foam absorbs a quantity of paint that is applied to a surface through the textile. The plate attaches to a handle that is used to control the painting pad. Painting pads are adapted generally used for cutting in processes.

Paint Roller: As used in this disclosure, a paint roller is a rolling structure that: 1) is covered in an absorbent material; and, 2) is used to apply paint to a surface.

Paint Sprayer: As used in this disclosure, a paint sprayer is a device that applies a coat of paint on a surface. The paint sprayer is a pump that: a) generates a pressure differential that pumps paint out of a containment structure; and, b) discharges the pumped paint as a spray that lands on the surface to be painted.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path 2 between two objects or structures.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Rigid Structure: As used in this disclosure, a rigid structure is a solid structure formed from an inelastic material that resists changes in shape. A rigid structure will permanently deform as it fails under a force. See bimodal flexible structure.

Robot: As used in this disclosure, a robot is a programmable electronic device that automatically performs a series of predetermined actions.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Solid: As used in this disclosure, a solid refers to a state (phase) of matter that: 1) has a fixed volume; and, 2) does not flow.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switching Circuit: As used in this disclosure, a switching circuit is non-programmable electrical device that receives one or more digital or analog inputs and uses those digital or analog inputs to generate one or more digital or analog outputs.

Swivel: As used in this disclosure, a swivel is a fastening structure that attaches a first object to a second object such that will rotate around an axis of rotation while the second object remains in a fixed position relative to the first object.

Track: As used in this disclosure, a track is a physical structural relationship between a first object and a second object that serves a purpose selected from the group consisting of: 1) fastening the second object to the first object; 2) controlling the path of motion of the first object relative to the second object in at least one dimension and in a maximum of two dimensions; or, 3) a combination of the first two elements of this group.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Valve: As used in this disclosure, a valve is a device that is used to control the flow of a fluid (gas or liquid) through a pipe, tube, or hose.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An automated painting machine comprising
   a housing structure, a fluid management structure, a plurality of actuator structures, and a control circuit;
   wherein the fluid management structure, the plurality of actuator structures, and the control circuit are contained in the housing structure;
   wherein the automated painting machine is configured for use with a paint;
   a plurality of hydraulic head stanchions;
   a plurality of hydraulic leg stanchions;
   wherein the plurality of actuator structures comprises a plurality of cant motors, a plurality of head stanchion hydraulic pumps, a leg stanchion hydraulic pump, and an arm track motor;
   wherein each cant motor selected from the plurality of cant motors is an electric motor;
   wherein each selected cant motor secures an applicator head selected from the plurality of applicator heads to the head stanchion hydraulic pump associated with the selected applicator head;
   wherein the plurality of applicator heads comprises a spray head, a brush head, and a roller head;
   wherein each selected cant motor adjusts the cant of the discharge of the paint relative to a force of gravity;
   wherein the control circuit controls the operation of each selected cant motor;
   wherein each hydraulic head stanchion pump selected from the plurality of head stanchion hydraulic pumps is a hydraulic pump;
   wherein each selected hydraulic head stanchion pump controls a span of the length hydraulic head stanchion;

wherein the elevation of the applicator head associated with each selected hydraulic head stanchion is adjusted by the hydraulic head stanchion pump;
wherein the control circuit controls the operation of each selected hydraulic head stanchion pump;
wherein the leg stanchion hydraulic pump is a hydraulic pump;
wherein the leg stanchion hydraulic pump controls a span of the length of each hydraulic leg stanchion selected from the plurality of hydraulic leg stanchions;
wherein the control circuit controls the operation of the leg stanchion hydraulic pump;
wherein the arm track motor is an electric motor;
wherein the arm track motor mounts on the track;
wherein the arm track motor provides the motive forces necessary to move the plurality of applicator heads in the horizontal direction along the track formed by the arm track structure.

2. The automated painting machine according to claim 1
wherein the automated painting machine automatically applies the paint to a target surface;
wherein the fluid management structure stores and transports the paint through the housing to the surface;
wherein the plurality of actuator structures provide the motive forces required to apply the paint to the desired locations on the surface;
wherein the control circuit controls the operation of the fluid management structure and the plurality of actuator structures.

3. The automated painting machine according to claim 2
wherein the housing structure is a rigid structure;
wherein the housing structure is a roughly prism shaped structure;
wherein the housing structure has the primary shape of a prism;
wherein the housing structure is a hollow structure;
wherein the housing structure is a rolling structure;
wherein the housing structure forms a protected space that contains the fluid management structure, the plurality of actuator structures, and the control circuit.

4. The automated painting machine according to claim 3
wherein the fluid management structure is the structure that manages the paint within the automated painting machine;
wherein the fluid management structure stores the paint;
wherein the fluid management structure generates the physical motive forces necessary to transport the paint;
wherein the fluid management structure routes the transported paint to an applicator head selected from a plurality of applicator heads;
wherein the fluid management structure discharges the paint from the selected applicator head to the target surface.

5. The automated painting machine according to claim 4
wherein each actuator structure selected from the plurality of actuator structures is a mechanical device;
wherein the plurality of actuator structures provides the motive forces necessary to target the paint that is discharged from the fluid management structure to a specific location on the target surface;
wherein the plurality of actuator structures adjust the elevation of the housing structure relative to the supporting surface;
wherein the plurality of actuator structures adjust the elevations of the plurality of applicator heads relative to the supporting surface;
wherein the plurality of actuator structures adjust the horizontal positions of the plurality of applicator heads relative to the supporting surface;
wherein the plurality of actuator structures adjust the discharge the cant of the paint that is discharged from the plurality of applicator heads relative to the force of gravity.

6. The automated painting machine according to claim 5
wherein the control circuit is an electric circuit;
wherein the control circuit controls the operation of the fluid management structure;
wherein the control circuit controls the operation of each actuator structure selected from the plurality of actuator structures.

7. The automated painting machine according to claim 6
wherein the housing structure comprises a pedestal structure and a shell structure;
wherein the pedestal structure attaches to the shell structure.

8. The automated painting machine according to claim 7
wherein the fluid management structure comprises a paint pump, a directional control valve, and a plurality of applicator heads;
wherein the paint pump, the directional control valve, and the plurality of applicator heads are fluidically interconnected;
wherein the plurality of applicator heads comprises a spray head, a brush head, and a roller head;
wherein the spray head is a paint sprayer;
wherein the spray head discharges the paint received from the directional control valve as a spray onto the targeted surface;
wherein the brush head is a paint brush;
wherein the brush head applies the paint received from the directional control valve as a coating;
wherein the roller head is a paint brush;
wherein the roller head applies the paint received from the directional control valve as a coating.

9. The automated painting machine according to claim 8
wherein the control circuit comprises a plurality of control signals, a switching circuit, and a distance sensor;
wherein the switching circuit is an electric circuit;
wherein the switching circuit electrically connects to the control circuit;
wherein the switching circuit allows a user to select the applicator head from the plurality of applicator heads that is used to apply the paint;
wherein the distance sensor is a distance sensor;
wherein the distance sensor provides an indication to the control circuit of the span of the distance between the targeted surface and the control circuit;
wherein each control signal selected from the plurality of control signals is an electric signal generated by the control circuit;
wherein each control signal selected from the plurality of control signals controls the operation of an actuator structure selected from the plurality of actuator structures;
wherein the plurality of control signals comprises a plurality of cant control signals, a plurality of head stanchion control signals, a leg stanchion hydraulic control signal, an arm track motor control signal, and a directional control valve control signal;
wherein the leg stanchion hydraulic control signal forms the electric control signal that is used by the control circuit to control the operation of the leg stanchion hydraulic pump;

wherein the arm track motor control signal forms the electric control signal that is used by the control circuit to control the operation of the arm track motor;

wherein the directional control valve control signal forms the electric control signal that is used by the control circuit to control the operation of the directional control valve;

wherein by adjustable is meant that the elevation of the shell structure adjusts by adjusting the pedestal structure;

wherein the pedestal structure is a rolling structure;

wherein the shell structure is a rigid structure;

wherein the shell structure is a prism shaped structure;

wherein the shell structure is a hollow structure;

wherein the shell structure forms the protected space that contains the fluid management structure, the plurality of actuator structures, and the control circuit.

10. The automated painting machine according to claim 9 wherein the pedestal structure is a mechanical structure;

wherein the pedestal structure is a load bearing structure;

wherein the pedestal structure attaches to the inferior surface of the shell structure;

wherein the pedestal structure rest on the supporting surface;

wherein the pedestal structure transfers the load of the automated painting machine to the supporting surface;

wherein the pedestal structure elevates the shell structure above the supporting surface;

wherein the pedestal structure is an adjustable structure such that an elevation of the shell structure to adjust by adjusting the pedestal structure;

wherein by adjustable is meant that the elevation of the shell structure adjusts by adjusting the pedestal structure;

wherein the pedestal structure is a rolling structure;

wherein the shell structure is a rigid structure;

wherein the shell structure is a prism shaped structure;

wherein the shell structure is a hollow structure;

wherein the shell structure forms the protected space that contains the fluid management structure, the plurality of actuator structures, and t he control circuit.

11. The automated painting machine according to claim 10 wherein the pedestal structure comprises the plurality of hydraulic leg stanchions and a plurality of casters;

wherein the plurality of hydraulic leg stanchions forms a load bearing structure;

wherein the plurality of hydraulic leg stanchions forms the structure that elevates the shell structure above the supporting surface;

wherein the plurality of hydraulic leg stanchions is an adjustable structure such that the span of the length of each hydraulic leg stanchion selected from the plurality of hydraulic leg stanchions is adjustable;

wherein by adjustable is meant that the span of the length of each hydraulic leg stanchion selected from the plurality of hydraulic leg stanchions is adjustable;

wherein the elevation of the shell structure adjusts by adjusting the span of the length of each hydraulic leg stanchion selected from the plurality of hydraulic leg stanchions;

wherein the control circuit controls the span of the length of the plurality of hydraulic leg stanchions;

wherein each caster selected from the plurality of casters is a rolling structure;

wherein each caster selected from the plurality of casters attaches to the inferior end of a hydraulic leg stanchion selected from the plurality of hydraulic leg stanchions;

wherein each caster selected from the plurality of casters transfers the load its associated hydraulic leg stanchion to the supporting surface;

wherein the shell structure comprises a paint reservoir, an arm track structure, and the plurality of hydraulic head stanchions;

wherein the paint reservoir is a fluid impermeable container;

wherein the paint reservoir contains the paint;

wherein the arm track structure is a mechanical structure;

wherein the plurality of hydraulic head stanchions attach to the arm track structure;

wherein the arm track structure forms a track that guides the movement of the plurality of hydraulic head stanchions in the horizontal direction;

wherein each hydraulic head stanchion selected from the plurality of hydraulic head stanchions is a hydraulic structure;

wherein an applicator head selected from the plurality of applicator heads attaches to a hydraulic head stanchion selected from the plurality of hydraulic head stanchions;

wherein each selected hydraulic head stanchion is an adjustable structure such that elevation of the applicator head associated with the selected hydraulic head stanchion is adjustable;

wherein the applicator head associated with the selected hydraulic head stanchion mounts on the superior end of the selected hydraulic head stanchion.

12. The automated painting machine according to claim 11 wherein the paint pump is a pump;

wherein the paint pump generates a pressure differential that transports the paint through the directional control valve and the plurality of applicator heads for discharge onto the target surface;

wherein the directional control valve is a valve structure;

wherein the directional control valve is a three way four position directional control valve;

wherein the directional control valve is controlled by the paint;

wherein the directional control valve forms a fluidic connection with the paint pump;

wherein the directional control valve receives paint under pressure from the paint pump;

wherein the directional control valve forms a fluidic connection between the received paint and each applicator head selected from the plurality of applicator heads;

wherein the directional control valve routes the received paint to an applicator head selected from the plurality of applicator heads;

wherein the selected applicator head is provided to the directional control valve through the control circuit;

wherein each applicator head selected from the plurality of applicator heads is a nozzle structure;

wherein each selected applicator head receives paint under pressure from the directional control valve;

wherein each selected applicator head discharges the received paint directly onto the targeted surface;

wherein the elevation of each selected applicator head above the pedestal structure is adjustable.

13. The automated painting machine according to claim 12
   wherein the directional control valve comprises a spray head port, a brush head port, a roller head port, and an input port;
   wherein the spray head port is a discharge port of the directional control valve;
   wherein the spray head port forms a fluidic connection with the spray head;
   wherein the control circuit opens the fluidic connection such that paint flows through the input port and the spray head port to the spray head when the spray head port is in the first position;
   wherein the spray head port is in the closed position when the control circuit places the directional control valve in a position selected from the group consisting of the second position, the third position, and the fourth position;
   wherein the brush head port is a discharge port of the directional control valve;
   wherein the brush head port forms a fluidic connection with the brush head;
   wherein the control circuit opens the fluidic connection such that paint flows through the input port and the brush head port to the brush head when the brush head port is in the second position;
   wherein the brush head port is in the closed position when the control circuit places the directional control valve in a position selected from the group consisting of the first position, the third position, and the fourth position;
   wherein the roller head port is a discharge port of the directional control valve;
   wherein the roller head port forms a fluidic connection with the roller head;
   wherein the control circuit opens the fluidic connection such that paint flows through the input port and the roller head port to the roller head when the roller head port is in the third position;
   wherein the roller head port is in the closed position when the control circuit places the directional control valve in a position selected from the group consisting of the first position, the second position, and the fourth position;
   wherein the input port forms a fluidic connection with the paint pump;
   wherein the input port receives the paint from the paint pump into the directional control valve.

14. The automated painting machine according to claim 13
   wherein the plurality of cant motors comprises a spray head cant motor, a brush head cant motor, and a roller head cant motor;
   wherein the spray head cant motor attaches the spray head to the hydraulic head stanchion selected from the plurality of hydraulic head stanchions that is associated with the spray head;
   wherein the spray head cant motor provides the motive forces that rotate the spray head relative to the associated hydraulic head structure;
   wherein the brush head cant motor attaches the brush head to the hydraulic head stanchion selected from the plurality of hydraulic head stanchions that is associated with the brush head;
   wherein the brush head cant motor provides the motive forces that rotate the brush head relative to the associated hydraulic head structure;
   wherein the roller head cant motor attaches the roller head to the hydraulic head stanchion selected from the plurality of hydraulic head stanchions that is associated with the roller head;
   wherein the roller head cant motor provides the motive forces that rotate the roller head relative to the associated hydraulic head structure;
   wherein the plurality of head stanchion hydraulic pumps comprises a spray head hydraulic pump, a brush head hydraulic pump, and a roller head hydraulic pump;
   wherein the spray head hydraulic pump is a hydraulic pump that controls the hydraulic pressure of a fluid contained in the hydraulic head stanchion selected from the plurality of hydraulic head stanchions that is associated with the spray head;
   wherein the spray head hydraulic pump provides the motive forces that are necessary to change the elevation of the spray head relative to the supporting surface;
   wherein the brush head hydraulic pump is a hydraulic pump that controls the hydraulic pressure of a fluid contained in the hydraulic head stanchion selected from the plurality of hydraulic head stanchions that is associated with the brush head;
   wherein the brush head hydraulic pump provides the motive forces that are necessary to change the elevation of the brush head relative to the supporting surface;
   wherein the roller head hydraulic pump is a hydraulic pump that controls the hydraulic pressure of a fluid contained in the hydraulic head stanchion selected from the plurality of hydraulic head stanchions that is associated with the roller head;
   wherein the roller head hydraulic pump provides the motive forces that are necessary to change the elevation of the roller head relative to the supporting surface.

15. The automated painting machine according to claim 14
   wherein the plurality of cant control signals forms the collection of electric control signals that are used by the control circuit to control the operation of the plurality of cant motors;
   wherein the plurality of cant control signals comprises a spray head cant control signal, a brush head cant control signal, and a roller head cant control signal;
   wherein the spray head cant control signal forms the electric control signal that is used by the control circuit to control the operation of the spray head cant motor;
   wherein the brush head cant control signal forms the electric control signal that is used by the control circuit to control the operation of the brush head cant motor;
   wherein the roller head cant control signal forms the electric control signal that is used by the control circuit to control the operation of the roller head cant motor;
   wherein the plurality of head stanchion control signals forms the collection of electric control signals that are used by the control circuit to control the operation of the plurality of head stanchion hydraulic pumps;
   wherein the plurality of head stanchion control signals comprises a spray head hydraulic control signal, a brush head hydraulic control signal, and a roller head hydraulic control signal;
   wherein the spray head hydraulic control signal forms the electric control signal that is used by the control circuit to control the operation of the spray head hydraulic pump;

wherein the brush head hydraulic control signal forms the electric control signal that is used by the control circuit to control the operation of the brush head hydraulic pump;

wherein the roller head hydraulic control signal forms the electric control signal that is used by the control circuit to control the operation of the roller head hydraulic pump.

* * * * *